United States Patent [19]

Bergsma

[11] Patent Number: 4,646,772

[45] Date of Patent: Mar. 3, 1987

[54] FUEL TANK MOUNTED ROLL-OVER VALVE

[75] Inventor: Rudolph Bergsma, Ann Arbor, Mich.

[73] Assignee: G.T. Products, Inc., Ann Arbor, Mich.

[21] Appl. No.: 764,893

[22] Filed: Aug. 12, 1985

[51] Int. Cl.$^4$ .............................................. F16K 17/36
[52] U.S. Cl. ........................................ 137/39; 137/43; 220/202; 220/203
[58] Field of Search ................... 137/39, 43; 220/202, 220/203, 204

[56] References Cited

U.S. PATENT DOCUMENTS

| | | | |
|---|---|---|---|
| 2,356,327 | 8/1944 | Lebus | 220/203 |
| 3,084,706 | 4/1963 | Lunde | 220/202 X |
| 4,033,475 | 7/1977 | Evans | 137/43 X |
| 4,095,609 | 1/1978 | Martin | 137/43 |
| 4,162,021 | 7/1979 | Crute | 137/43 X |

Primary Examiner—Robert G. Nilson
Attorney, Agent, or Firm—Rhodes and Boller

[57] ABSTRACT

A roll-over valve assembly is adapted for mounting on a fuel tank so as to expose internal portions of the valve mechanism to the tank headspace. Because liquid may slosh about in the tank, the valve includes a structure for shedding liquid fuel away from the main orifice so as to minimize intrusion of liquid fuel through the main orifice into an associated vapor control system to which the valve is connected. The roll-over valve further includes a relief and return vent valve mechanism which has a cooperative association with the tank headspace and the associated vapor control system. The valve assembly comprises a relatively small number of individual parts and it is cost effective for the various functions which it performs. The preferred embodiment utilizes a caged ball for closing the valve upon roll-over.

17 Claims, 16 Drawing Figures

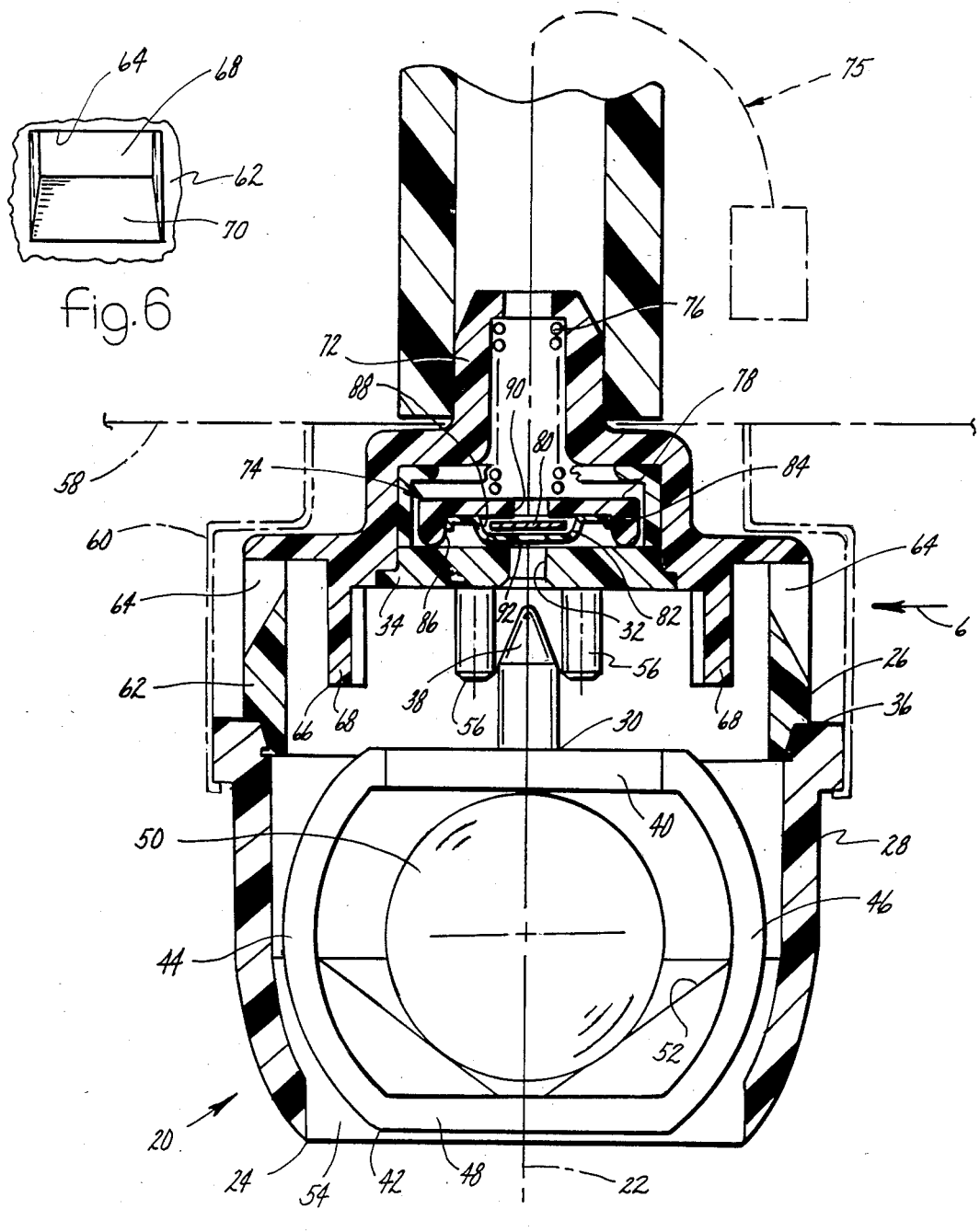
fig. 6
fig. 1
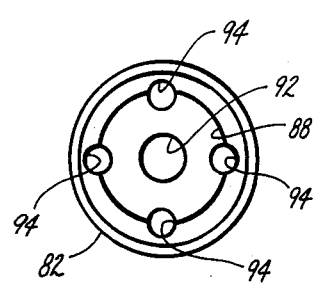
fig. 4
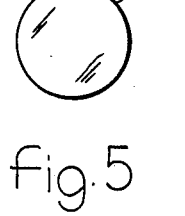
fig. 5
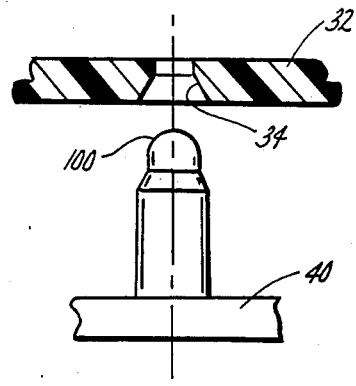
fig. 10

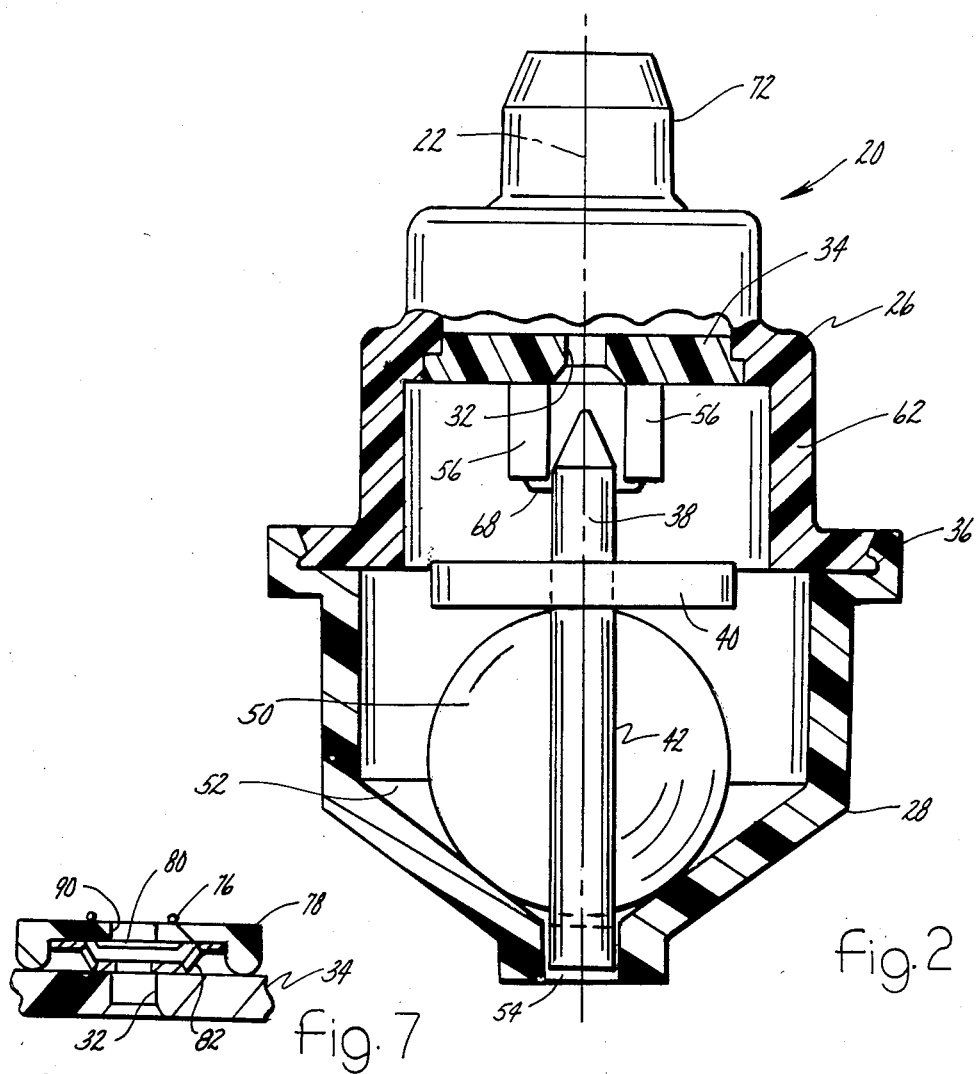
fig. 2
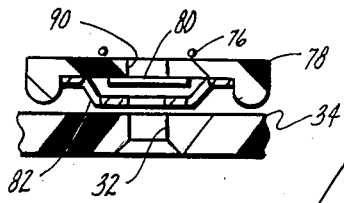
fig. 7
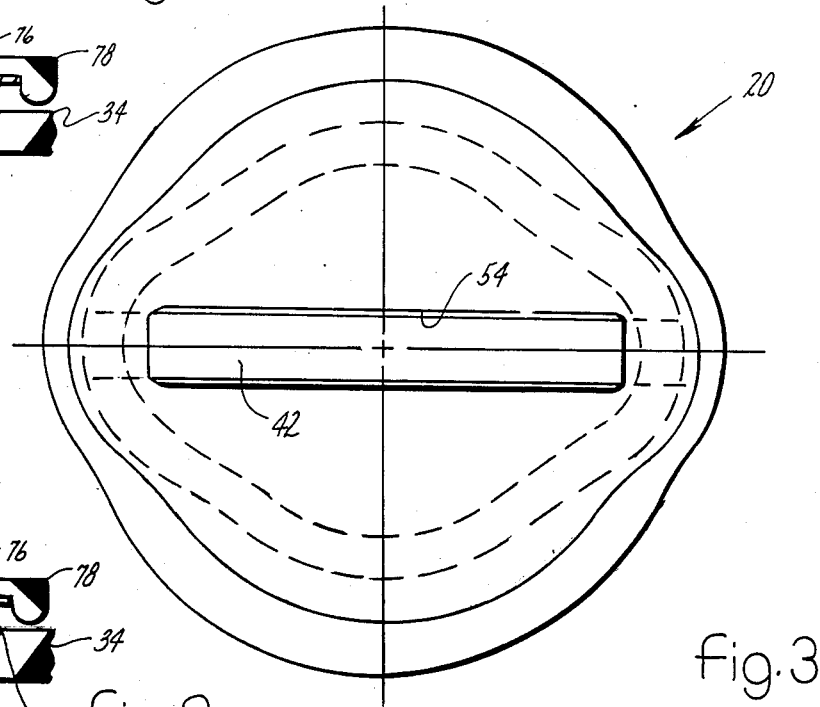
fig. 3
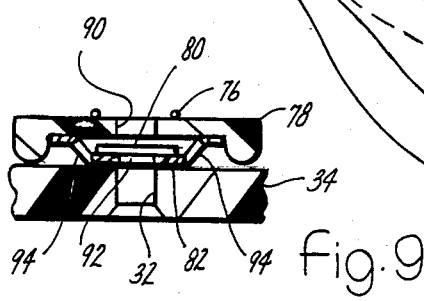
fig. 8
fig. 9

FUEL TANK MOUNTED ROLL-OVER VALVE

BACKGROUND AND SUMMARY OF THE INVENTION

This invention relates generally to roll-over valves. More particularly, it relates to a roll-over valve which is adapted for mounting on an automotive vehicle fuel tank.

In order to comply with evaporative emission requirements, automotive vehicles are today typically equipped with a vapor control system, commonly referred to as an evaporative emission control system. The usual evaporative emission control system comprises a cannister which is connected to the headspace of the fuel tank by a conduit and which contains a medium capable of adsorbing fuel vapors. When temperature and pressure conditions are such that the fuel vapor pressure in the tank headspace increases beyond a certain threshold, vapors are allowed to pass through the conduit to the cannister where they are collected. In this way, the uncontrolled escape of vapor to atmosphere is avoided. Because the capacity of the medium in the cannister is limited, purging of the cannister takes place at certain times, and there are various known techniques for accomplishing cannister purging, including a return venting of the cannister back to the tank through the conduit under certain conditions conducive to return venting.

A further requirement which has been imposed on automotive vehicles relates to leakage of liquid fuel in the event of vehicle roll-over. In order to comply with this requirement, a roll-over valve is typically placed in the conduit from the fuel tank to the vapor control system cannister. A roll-over valve is an attitude-responsive device which remains open so long as the vehicle is operating in the usual manner over relatively flat terrain or up and down hills. If however the vehicle should roll over, the roll-over valve operates to close the conduit between the fuel tank and the cannister so that fuel does not leak out through the conduit and cannister.

The amount of attitude change which is required to operate a roll-over valve from open to closed position depends to a certain extent on the design of the valve itself. Some designs require 90° or more change, whereas others require a lesser amount of change to close the valve.

For example U.S. Pat. No. 4,095,609 illustrates a roll-over valve which utilizes a caged sphere disposed on a conically tapered seat. When the valve is upright, the sphere seats at the center of the conically tapered seat and causes the cage to assume a full down position so that the valve is open. A change in attitude of the valve in any direction will cause the sphere to roll off the center of the conical seat. The interaction of the rolling sphere with the cage causes the cage to be displaced away from the conical seat and operate the valve toward the closed position. At a predetermined amount of tipping or attitude change, the sphere will have rolled sufficiently from the center of the conical seat to cause the valve to close. Other types of attitude-responsive valves are illustrated in U.S. Pat. Nos. 2,396,233; 1,683,338; 1,942,630; 4,325,398; and 4,487,215.

Various types of valve mechanisms can also associate with the fuel tank closure cap for the purpose of relieving or venting the tank. Generally these valve mechanisms are intended to open under extreme vapor conditions which cannot be relieved by the cannister control system. In other words, they are really in the nature of a safety which vents the tank directly to atmosphere under extreme pressure conditions. Other patents relating to fuel tank venting and/or roll-over are: U.S. Pat. Nos. 3,938,692; 3,996,951; 3,568,695; 4,162,021; 4,000,828; 3,757,987; 4,033,475; 4,285,440; 1,893,942; 4,023,583; 3,985,260; and 4,457,325.

The present invention is directed to a new and improved roll-over valve which offers important advantages and benefits over prior valves.

One important advantage of the present invention is that the roll-over valve is well-suited for mounting directly on the fuel tank with a portion of the valve body being actually disposed in the headspace of the tank so that the main valve member and main orifice are exposed directly to the headspace. With the valve so disposed, even though at virtually the highest point of the tank, the valve is still subject to the liquid fuel swashing about in the tank, and intrusion of liquid fuel into the vapor control system is undesirable. One of the features of the present invention is a unique configuration which serves to shed the liquid fuel away from the main valve member and main orifice so that intrusion of liquid fuel through the main orifice and into the vapor control system is minimized or even eliminated.

Another important feature of the invention relates to an associated valving mechanism which provides pressure relief and return vent functions in association with the vapor control system. The valve of the present invention comprises a relief valve member which has a cooperative association with the main orifice so that above a predetermined pressure in the tank, the tank's headspace is relieved to the vapor control system. A return vent valve is carried by the relief valve member to allow return vent flow from the vapor control system back to the tank when conditions in the vapor control system relative to those in the headspace of the tank are conducive to such return venting. This is useful for cannister purging.

The vent valve member comprises a disc which is captured within a depression in the relief valve member by a retainer member. The disc has the ability to float radially with a pocket of the retainer member such that for any radial position within the pocket, proper operation is assured.

The preferred embodiment has a construction which is especially advantageous in its organization and arrangement. It has a number of parts which fit together without the need for extra attaching parts. It is also compact and has only a small number of individual component parts. It is efficient in its use of materials and is especially cost effective for the functions which it performs.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a vertical axial cross sectional view through a preferred embodiment of roll-over valve assembly containing principles of the present invention.

FIG. 2 is a view similar to FIG. 1 but taken at 90° from the view of FIG. 1.

FIG. 3 is a bottom end view of FIG. 1

FIG. 4 is an end view of one of the component parts of the valve assembly of FIG. 1 shown by itself.

FIG. 5 is an end view of another of the component parts of the valve assembly of FIG. 1 shown by itself.

FIG. 6 is a fragmentary view looking in the direction of arrow 6 in FIG. 1.

FIGS. 7, 8 and 9 are fragmentary views useful in llustrating principles of operation of certain portions of the valve assembly.

FIG. 10 is a fragmentary view illustrating an alternate construction for a portion of the valve assembly.

DESCRIPTION OF THE PREFERRED EMBODIMENT

Figure 11:
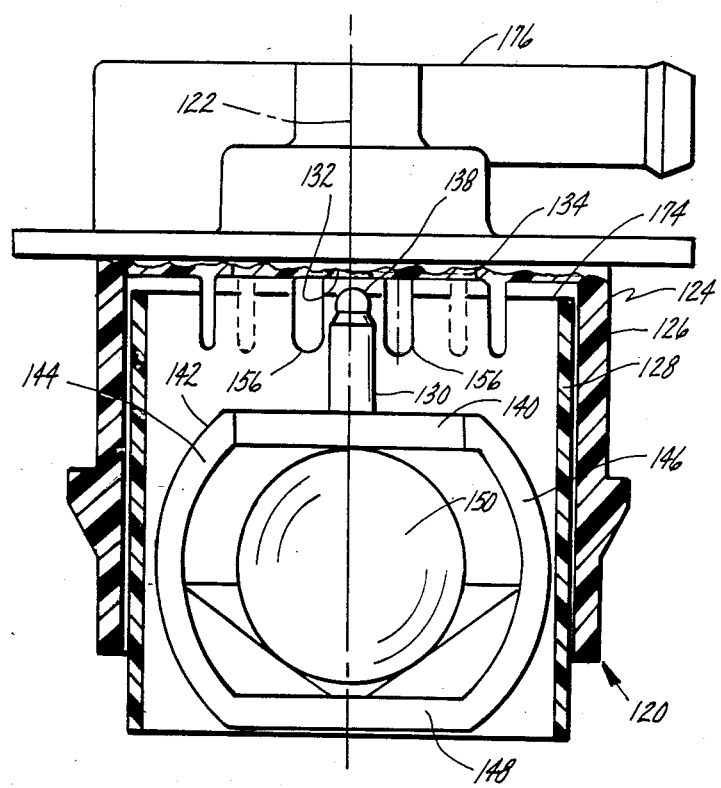
FIGS. 11 and 12 are cross sectional views corresponding respectively to FIGS. 1 and 2 but of another embodiment of valve assembly.

FIGS. 1, 2 and 3 illustrate the general organization and arrangement of a presently preferred embodiment of roll-over valve assembly 20 embodying principles of the present invention. Valve assembly 20 has a main axis 22 and comprises a valve body 24 consisting of two parts 26 and 28. Disposed within the interior of the body 24 is a main valve member 30 which is cooperatively associated with a main orifice 32 formed in an orifice plate 34. As will become more apparent from the ensuing description, valve member 30 closes orifice 32 upon roll-over.

The general shape of body 24, as viewed endwise (See FIG. 3 for example), is an elliptical one, with the view of FIG. 1 being through the major plane and the view of FIG. 2 being through the minor plane. For certain usages of the invention, the elliptical shape is desirable, but it does not impose a limitation on the broader aspects of the invention.

The two valve body parts 26 and 28 have sidewalls terminating in free ends which fit together in assembly as indicated by the reference numeral 36. As illustrated, these free ends are shaped to provide an interlocking snap-fit so that separate attaching parts or joining procedures are unnecessary. For this purpose, the material of the parts may be any suitable plastic, such as Celcon by way of example.

Valve member 30 comprises a conically tapered valve tip 38 which projects uprightly from a circular head 40 coaxially with axis 22. Integral with head 40 is a bar 42 which comprises side segments 44, 46 and an end segment 48. The thicknesses of head 40 and segments 44, 46, 48 are all substantially the same, as can be seen in FIG. 1. The widths of segments 44, 46, 48 are essentially the same, as appears in FIG. 2. Head 40 and bar 42 form a cage for a sphere 50.

The lower end of body part 28 contains an integral, diametrically slotted, conical seat 52 which is coaxial with axis 22. The diametrical slot is designated by the reference numeral 54, and it extends across the major axis of the elliptical cross section. It is also open at the lower end of the valve body. The slot's width is slightly greater than the width of bar 42, as appears in FIG. 2.

FIGS. 1 and 2 illustrate the open position of the roll-over valve assembly (i.e. orifice 32 open). Approximately the lower half of the bar 42 is disposed within slot 54 for this open position. Sphere 50 also seats at the center of seat 52 for the illustrated position.

Tipping of the valve assembly in any direction from the vertical will create a tendency for sphere 50 to roll outwardly on seat 52. As the sphere rolls outwardly, it becomes eccentric relative to axis 22 and it acts on head 40 to move valve member 30, the mass of the sphere being great enough to overcome the inertia of the valve member. The result is to move valve tip 38 toward orifice 32.

Because there is a certain looseness in the fit of bar 42 within slot 54 and because the action of sphere 50 on the valve member comprises not solely an axial component of force, but a radial one as well, it is desirable to include a guide structure around tip 38. This guide structure comprises four circular posts 56 arranged 90° apart around orifice 32 and integrally formed with orifice plate member 34 to depend axially, from the orifice plate member. These posts assist in guiding the tip into the orifice.

At a certain inclination of the valve assembly relative to vertical, sphere 50 will have rolled sufficiently outwardly on the seat to cause the valve tip to close orifice 32 and block flow through the orifice. This represents the closed condition of the roll-over valve assembly such as would typically occur in a roll-over condition where a predetermined amount of tipping has been equaled or exceeded. Once the valve assembly has been closed, there is no further outward movement of the sphere on the seat. The bar however remains engaged with slot 54 so that when the roll-over condition has been corrected, the sphere can roll back down the seat, acting on bar segment 48 to move the cage axially downwardly and cause tip 38 to open orifice 32.

One of the significant attributes of the present invention is that the roll-over valve assembly can mount directly atop the fuel tank. In this way there is no separate conduit from the tank to the roll-over valve. Moreover, the valve assembly can be disposed in a space which is otherwise unused and with the interior of the valve assembly exposed to the fuel tank's headspace. An associated relief and return vent valve mechanism (to be hereinafter described) is exposed directly to pressure in the tank headspace.

The broken line 58 represents one type of mounting on a fuel tank which may include a depending mounting bracket 60 which is crimped onto the roll-over valve's body. The bracket does not prevent the liquid or gas from contacting the sidewall of the roll-over valve. Although mounting of the valve assembly within the tank exposes internal parts of the valve assembly to the liquid fuel in the tank, the present invention, in one respect, provides a unique organization and arrangement for shedding a liquid fuel away from the main valve member and main orifice so that the potential for intrusion of liquid fuel into the associated vapor control system is minimized or even eliminated. This is accomplished by a sidewall 62 circumferentially bounding tip 38 and main orifice 34 but containing apertures 64. In the illustrated embodiment there are two such apertures 64 located diametrically opposite each other. Each of these apertures has a limited circumferential extent and a certain axial extent. A further wall structure 66 is disposed radially inwardly of and in circumferential registry with apertures 64. Wall structure 66 comprises two wall sections 68 each of which circumferentially and axially overlaps a corresponding aperture 64. Wall structure 66 and sidewall 62 constitute a means for shedding liquid fuel away from the valve member and orifice while still allowing vapor in the tank headspace to be communicated to the main orifice.

As can be seen from consideration of FIG. 1 and FIG. 6, apertures 64 have a somewhat rectangular shape. However, lower edge 70 declines rather steeply in the radially outwardly direction to assist in shedding liquid fuel away from the interior of the valve. Any liquid which passes through an aperture will do so generally radially and therefore will impinge upon the corresponding wall section 68 and tend to fall downwardly toward seat 52. Bar 42 has sufficient clearance with slot 54 so that liquid fuel which is shed by wall section 68 can drain through the bottom of the valve assembly and fall back into the tank.

The interior space within the valve assembly is also made large so that it is difficult for any fuel which intrudes into the interior of the valve assembly to reach the valve member and orifice. Indeed the inherent tendency is for any fuel which enters the interior of the valve to fall downwardly and drain through the slot at the bottom, rather than being drawn upwardly toward the orifice. Therefore the valve assembly construction is especially advantageous in shedding liquid fuel away from the main orifice and valve tip.

The illustrated construction for the valve assembly further includes the provision for valving mechanism disposed between the outlet 72 of the valve assembly and orifice plate 34. This valving mechanism is a combined relief and return vent valve designated by the general reference numeral 74 and it has a cooperative association with an associated evaporative emission control system 75. It comprises only four separate parts which are a helical spring 76, a relief valve member 78, a return vent valve member 80, and a retainer member 82.

Relief valve member 78 is a circular member having a depending circumferential flange 84 defining a depression 86 in the lower face of the member. Spring 76 is disposed partially within the nipple which forms outlet 72 and in cooperative association with the member 78 so as to urge the latter downwardly, causing flange 84 to abut the upper surface of plate 34.

Return vent valve member 80 is a small, thin circular disc which is captured by retainer member 82 on relief valve member 78. Retainer member 82 has a circular shape and is pressed fo fit within depression 86. It is also shaped with a central, circular pocket 88, within which disc 80 is captured.

Relief valve member 74 comprises a central, circular orifice 90 coaxial with axis 22. Retainer member 82 also comprises a central, circular aperture 92 and in addition is provided with four more apertures 94 spaced 90° apart around the axis, extending into the side of pocket 88. (See FIG. 4)

Disc 80 is a small, very light-weight low-inertia element which by virtue of the construction is captured on relief valve member 78 by retainer member 82 but is capable of a limited amount of float both radially and axially. The relative dimensions are such that for any position of radial float of the disc, it will float axially upwardly to close orifice 90 whenever it is so urged. Similarly, when the disc is urged downwardly, only aperture 92 in retainer member 82 is fully closed.

FIG. 1 shows disc 80 floating in a free position apparently unsupported. While this illustration is for clarity, it would represent a possible position which the disc might assume when moving axially. FIGS. 7, 8 and 9 show three different operational positions of the relief and return vent valve mechanism 74. The operation to be described with reference to FIGS. 7, 8 and 9 is for a condition where the roll-over valve is open since it will be appreciated that if the roll-over valve is closed there can be no communication between the tank and the evaporative emission control system.

FIG. 7 shows the position when the pressure in the tank headspace is greater than that at the valve's outlet 72 which is in communication with the evaporative emission control system 75, which in broken lines is depicted by a cannister connected by a conduit to outlet 72. FIG. 7 is representative of headspace pressure not sufficiently great to require relief of the tank to the emission control system. Because of the nature of disc 80 and associated construction, a slightly positive tank pressure relative to that in the evaporative emission control system will be effective to float disc 80 to close orifice 90. This blocks a potential flow path through the relief valve member so that the relief valve can respond to relieve the tank when the headspace pressure becomes equal to or exceeds that at which relief is called for. The disc is exposed to differential pressure by virtue of the apertures in retainer member 88 and orifice 90 in relief valve member 78.

Relief is accomplished by the relief valve member being displaced slightly axially upwardly so that flange 84 unseats from the top surface of orifice plate 34. This is shown in FIG. 8. Pressure is relieved by a flow through orifice 32, thence radially outwardly through the space between flange 84 and the top surface of the orifice plate 34, thence axially along the outer perimeter of relief valve member 78 and thence radially inwardly and axially through outlet 72 to the evaporative emission control system. In this way there is a relief flow to the cannister for collecting fuel vapors. As the headspace pressure increases, there is a greater opening of the relief valve member. When the pressure has been relieved, the relief valve member returns to close against orifice plate 34.

FIG. 9 shows the condition when the pressure in the headspace has dropped below that in the emission control system. A pressure differential is created across the disc 80 which causes the disc to float downwardly against the bottom wall of pocket 88. For any radial float of the disc, it will close orifice 92 but will not fully close the outer apertures 94. Therefore flow can occur from the emission control system into outlet 72, through orifice 90, through orifices 84, through orifice 32, through the interior of the valve assembly back to the tank.

The roll-over valve assembly comprises a compact and efficient organization for the relief and return vent valve mechanism which is used in cooperative association with the evaporative emission control system. It can be mounted atop the fuel tank directly so that there is no need for a separate conduit from the tank to the roll-over valve, and the relief and return vent valve mechanism is disposed more closely to the headspace so that better sensitivity to the headspace pressure is obtained.

FIG. 10 illustrates an alternate configuration for the tip of the roll-over valve. In this embodiment the tip 100 is of a semi-spheroidal rather than conically tapered.

The shape of orifice 34 is also conformed to the shape of the tip.

The illustrated valve assembly is advantageous in that structural features of the invention are incorporated integrally into the individual parts. For example sidewall 62 and wall structure 66 are integrally formed in valve body part 26. Provision is also made for the snap-fit attachment of the orifice plate member 34 into the interior of the body part 26. As discussed earlier the disc is a separate element which is captured when the retainer member is press fitted to the relief valve member.

Because the valve assembly is exposed to the potentially corrosive action of gasoline or other comparable fuel, it is important for the parts to be made of materials which resist attack by such substances. Celcon is a plastic which has good fabrication properties and stability and is generally immune to attack by fuels. Therefore it is representative of a preferred material for the various plastic parts. The retainer member is preferably stamped brass which is also generally resistant to attack by gasoline.

Figure 12:
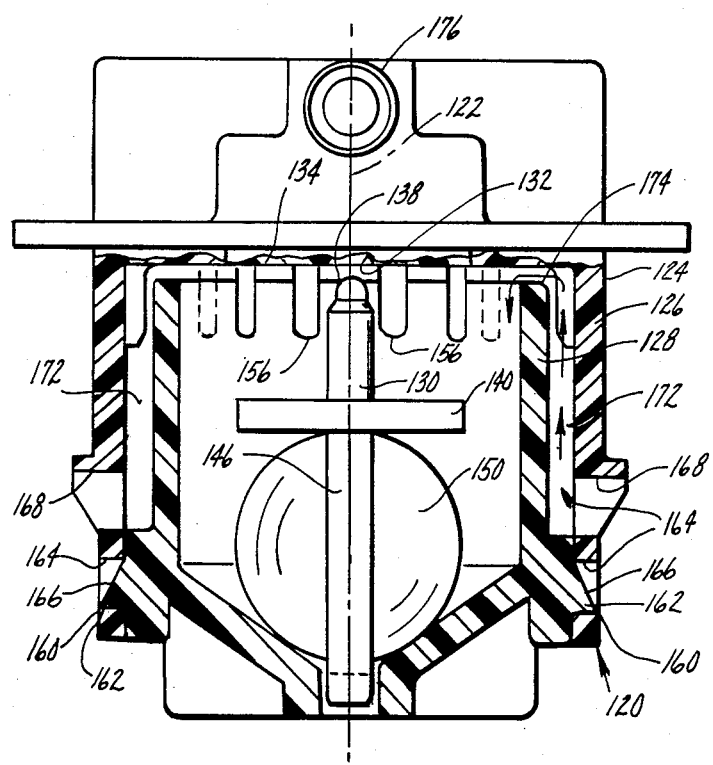

FIGS. 11 and 12 are cross sectional views corresponding respectively to FIGS. 1 and 2 but of another embodiment of valve assembly 120. Valve assembly 120 is like valve assembly 20 but differs in certain constructional details.

Valve assembly 120 comprises a main axis 122 and a valve body 124 consisting of two parts 126 and 128. Disposed within the interior of body 124 is a main valve member 130 which is cooperatively associated with a main orifice 132 formed in a orifice plate 134. The outward appearance of body 124 is generally circular, as distinguished from the general elliptical shape of body 24 of valve assembly 20.

Valve member 130 comprises a semi-spheroidal shaped tip 138 which projects uprightly from a circular head 140 coaxial with axis 122. Integral with head 140 is a bar 142 having side segments 144, 146 and an end segment 148. Head 140 and bar 142 form a cage for a sphere 150. A guide structure comprising four circular posts 156 arranged 90° apart around orifice 132 and integrally formed with orifice plate member 134 depend axially from the orifice plate member to assist in guiding the tip of the valve member 130 with respect to orifice 132. The operation of the valve assembly in closing the orifice upon tipping of the valve is essentially the same as that described in connection with valve assembly 20.

The two body parts 126 and 128 are constructed of suitable material, Celcon for example, and designed to have a snap fit engagement at 160. The snap fit engagement comprises a pair of triangular shaped projections 162 disposed on diametrially opposite sides of the outer surface of body part 128. The triangular shaped projections 162 are shown lodged in interlocking engagement with respective apertures 164 located diametrically opposite each other in the lower end of sidewall of body part 126. The two parts 126, 128 are assembled by aligning and registering the open upper end of part 128 with the open lower end of part 126 and then advancing the two towards each other. Inclined surfaces 166 of the projections 162 will come into engagement with the lower edge of part 128 and create an interaction between the two parts which allows the projections to pass into the open lower end of body part 126, and then upon coming into registry with the openings 164 body part 126 to snap into interlocking engagement with the projections. Hence, part 128 telescopes into part 126 with the latter being the outer part and the former, the inner part.

Outer part's 126 sidewall contains a pair of apertures 168 on diametrically opposite sides. These apertures 168 correspond to the apertures 64 of valve assembly 20; however they are located somewhat lower in the valve assembly. Inner body part's 128 sidewall extends upwardly from the frusto conically tapered seat and in radially inwardly spaced relationship to the sidewall of outer body part 126. Hence the sidewall of part 128 corresponds to the wall section 68 of valve assembly 20 in that it will resist the direct intrusion of any liquid fuel which may enter an aperture 168.

The construction does however provide a path of communication for the tank headspace, extending from each aperture 168 through a vertically extending portion 172 and thence over and around the upper edge of part 128 which is spaced from the wall of the outer body part 126. In this way the tank headspace is communicated to orifice 132 while the valve assembly is endowed with fuel shedding capability which prevents significant intrusion of liquid fuel into the interior of the valve assembly.

Like valve assembly 20 the interior space within valve assembly 120 is large so that there is a tendency for any liquid fuel which may intrude into the interior of the valve assembly to fall vertically downwardly and drain via the frustoconically tapered seat and slot.

Body part 126 is formed with a nipple 176 via which the valve is connected by means of a conduit, or any suitable means to an associated evaporative emission control system. Although not shown in FIGS. 11 and 12, the interior of the valve assembly between orifice plate 134 and nipple 174 comprises a relief and vent valve mechanism identical to that described in connection with valve assembly 20. Hence the operation and generic aspects of the valve assembly 120 are the same as those of valve assembly 20 previously described and therefore will not be repeated. Valve assembly 120 is shown by itself and it will be understood that suitable provisions can be made for the mounting of the same in the top of the tank headspace, preferably at the highest elevation in the tank where it will be disposed at a maximum spacing from the nominal fill level of the tank.

Figure 14:
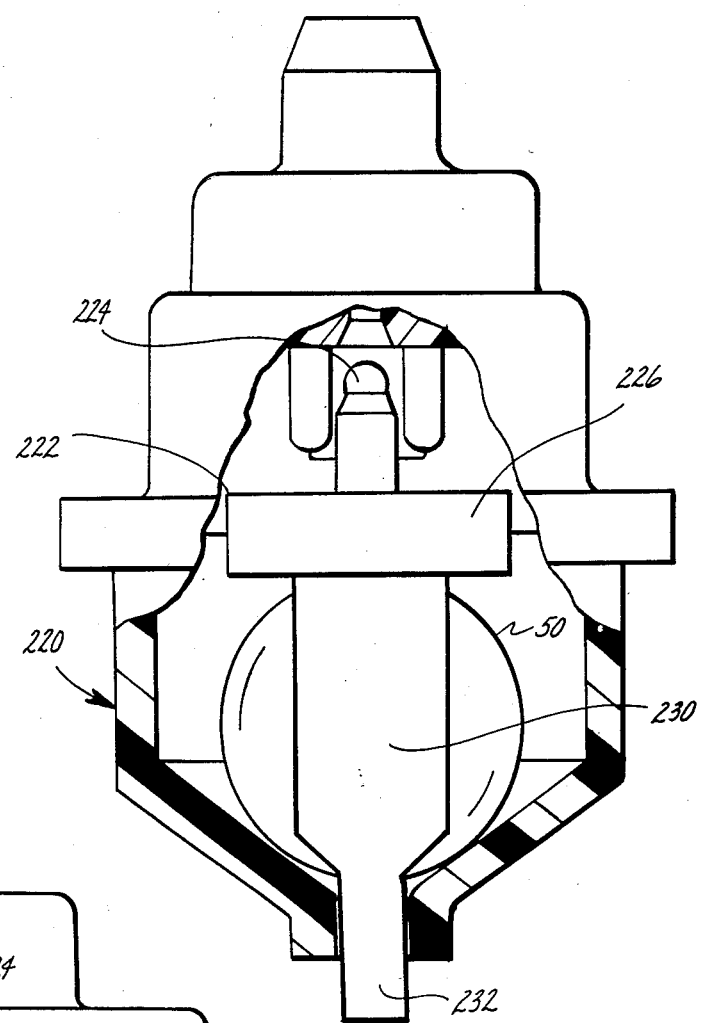
FIGS. 13 and 14 are cross sectional views similar to FIGS. 1 and 2 respectively of another embodiment of valve assembly.
Figure 13:
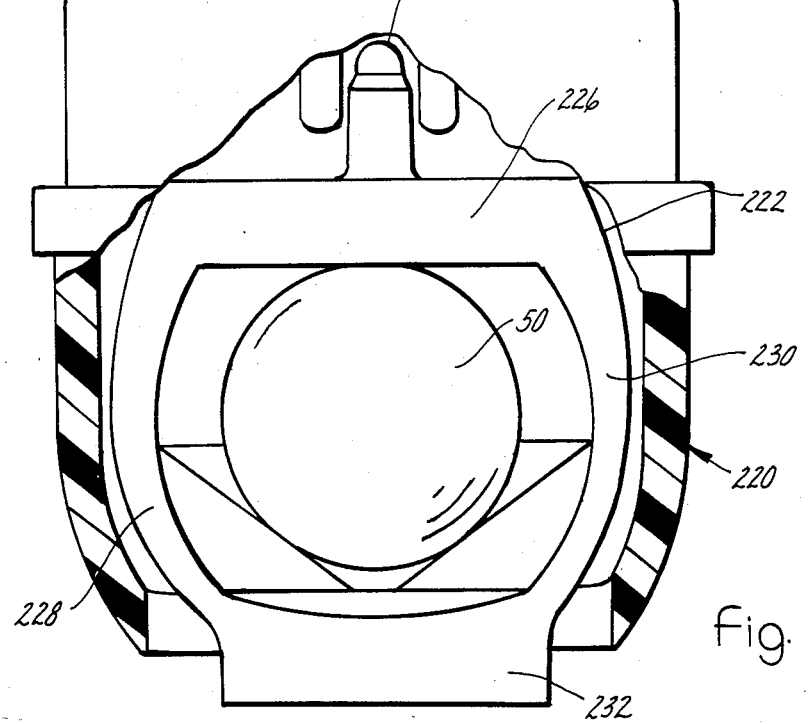

FIGS. 13 and 14 are cross sectional views similar to FIGS. 1 and 2 respectively of another embodiment of valve assembly 220. The valve assembly 220 is identical to valve assembly 20 except for the construction of the valve member and cage. Hence the same reference numerals of FIGS. 1, 2 are used in FIGS. 13 and 14 to identify the same parts with the exception of the valve member and integral cage.

The valve member and integral cage of valve assembly 220 is identified by the general reference numeral 222. It comprises a valve tip 224 with an integral circular head 226. The cage comprises side segments 228 and 230 and an end segment 232. It is to be observed that the thickness of head 226 is larger than the thickness of head 40 of valve assembly 20 and that the segments of the integral cage are also bigger. This is done to increase the mass of the cage and valve member per se to a level which will prevent what is commonly referred to as "corking".

It is also to be observed that the axial dimension across the cage between end segment 232 and head 222 is significantly greater than in valve assembly 20. In valve assembly 220, sphere 50 is effective in its interaction with the cage upon tipping of the valve assembly to cause the valve member to move toward the closed position, finally reaching the closed position at a predetermined amount of tipping.

However, unlike valve assembly 20, the sphere in valve assembly 220 cannot return the valve member to the open position because of the increased axial dimension of the cage opening. In other words if it is assumed that the valve member has been operated to the closed position by the ball, and the valve assembly is now restored toward a vertical position but with the cage being maintained to hold the valve member closed, there is sufficient clearance within the cage for the sphere to roll to the bottom of the seat without interacting with end segment 232. Hence when the valve is turned upright from a tipped position, it will be the mass of the valve member and cage along which is effective in opening the main orifice.

Because of the possibility of "corking", it is desirable to make the mass of the valve member and cage sufficient to overcome any such corking. The required mass may be determined in accordance with conventional engineering calculations based upon the pressure differential acting on the closed valve member. By enlarging the cage size as shown in FIGS. 13 and 14 and by increasing its density such as by using mineral-filled Celcon or other material, increased mass is efficiently obtained.

Figure 15:
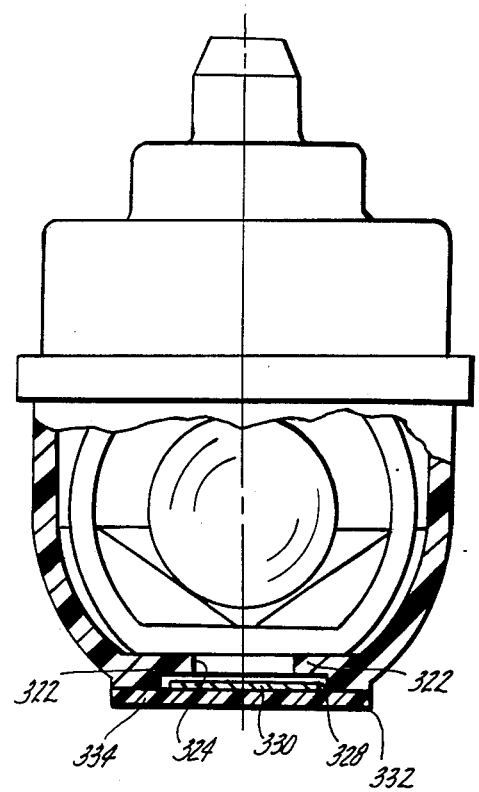
FIGS. 15 and 16 are cross sectional views corresponding to FIGS. 1 and 2 but illustrating a modification.
Figure 16:
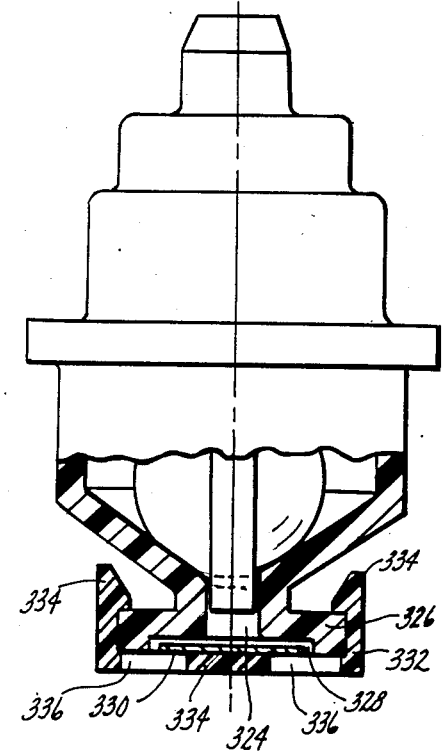

FIGS. 15 and 16 are cross sectional views corresponding to FIGS. 1 and 2 but illustrating a modification. In this modified form the opening at the bottom of the diametrically extending slot in the seat is associated with a flapper valve assembly. The purpose of the flapper valve assembly is to retain the ability to drain liquid fuel which may have entered the interior of the valve while inhibiting liquid fuel intrusion via the slot. It will be appreciated that although this modification is depicted with reference to the valve assembly 20, it may be made to any of the other valve assemblies in an analogous manner.

The size of the drain slot opening is reduced by a wall 322 which has a smaller central opening 324. A circular flange structure 326 is provided around the outside of the valve housing's lower end. A circular recess 328 is coaxially provided in the lower circular face of the flange structure and is in communication with opening 324. The thin circular disc 330 which forms the flapper valve element is disposed in this recess 328 and is captured by means of a circular retainer 332 which has a snap fit-engagement 334 with flange structure 326. The axial end of the retainer comprises a diametrically extending portion 334 underlying disc 330 and on opposite sides of which are provided apertures 336. As can be seen from consideration of the drawing figures, disc 330 has a limited amount of radial and axial float within recess 328 and yet is captured so as not to escape.

The drawing figures illustrate the valve disc in its downward position disposed against portion 334 and the dimensions of the disc 330 in relation to the recess and the apertures and opening are such that for any radial position of the disc, when down, there is an open path allowing liquid fuel to drain into the tank. If however liquid fuel is directed vertically upwardly toward the valve assembly then there is sufficient area exposed on the disc for causing it to be moved upwardly and to close off opening 324 and prevent liquid fuel from intruding into the interior through the slot. The disc may be made either buoyant or nonbuoyant in liquid fuel, as desired.

While a preferred embodiment of the invention has been disclosed, it will be appreciated that principles are applicable to other embodiments.

What is claimed is:

1. In combination with a tank for a volatile combustible liquid, an associated vapor control system which is in communication with the tank's headspace, and a roll-over valve assembly which controls flow between the tank's headspace and the vapor control system by being normally open when the tank is upright but closing when the tank is tipped a predetermined amount from upright, said roll-over valve assembly comprising a main axis along which a main orifice and a main valve member are cooperatively arranged to open and close the valve assembly, the improvement which comprises said main orifice and said main valve member being disposed in the tank's headspace but circumferentially bounded by a wall disposed radially outwardly thereof, one or more apertures extending radially through said wall, and further wall structure disposed in circumferential registry with and spaced radially from said one or more apertures, said wall and said further wall structure coacting to allow vapor pressure in the tank's headspace to be communicated to said main orifice while shedding liquid away from said main valve member and main orifice so as to thereby minimize the intrusion of liquid into the vapor control system, in which said further wall structure is disposed radially inwardly of said wall, in which there are two of said apertures arranged diametrically opposite each other about the main axis of the valve assembly and in which said further wall structure comprises two separate wall sections diametrically opposite each other in registry with a corresponding one of said two apertures, each wall section having a circumferential extent just slightly greater than the circumferential extent of the corresponding aperture.

2. The improvement set forth in claim 1 in which a relief and return vent valve means is disposed in the communication path to the vapor control system on a side of said main orifice opposite a side to which said main valve member is disposed, said relief and return vent valve means comprising a relief valve member which is operable to relieve the tank's headspace to the vapor control system at a predetermined pressure of the headspace relative to that in the vapor control system.

3. The improvement set forth in claim 2 wherein said relief and return vent valve means comprises a return vent valve member carried by said relief valve member for allowing return flow from the vapor control system to the tank when the pressure in the vapor control system exceeds that in the tank headspace.

4. The improvement set forth in claim 3 in which said return vent valve member comprises a small, thin disc axially and radially captured on the relief valve member by a retainer member and which is selectively cooperatively associated with an orifice through the relief valve member such that when a greater pressure exists in the tank's headspace than in the vapor control system, the disc closes the orifice of the relief valve member, but opens in response to an opposite pressure condition so that return flow can pass from the vapor control system through the orifice in the relief valve member and into the tank.

5. The improvement set forth in claim 4 in which said disc is captured on said relief valve member by said retainer member having a snap-fit with the relief valve member, said retainer member and said relief valve member cooperatively forming a space containing said disc and within said disc is free to float both axially and radially within predetermined limits, said space and disc having sizes which insure closure of the orifice in the relief valve member when the pressure in the tank exceeds that in the vapor control system and said retainer member comprising a pattern of apertures which permits return flow from the vapor control system to pass through the retainer member and into the tank when the pressure in the vapor control system exceeds that in the tank.

6. In combination with a tank for a volatile combustible liquid, an associated vapor control system which is in communication with the tank's headspace, and a roll-over valve assembly which controls flow between the tank's headspace and the vapor control system by being normally open when the tank is upright but closing when the tank is tipped a predetermined amount from upright, said roll-over valve assembly comprising a main axis along which a main orifice and a main valve member are cooperatively arranged to open and close the valve assembly, the improvement which comprises said main orifice and said main valve member being disposed in the tank's headspace but circumferentially bounded by a wall disposed radially outwardly thereof, one or more apertures extending radially through said wall, and further wall structure disposed in circumferential registry with and spaced radially from said one or more apertures, said wall and said further wall structure coacting to allow vapor pressure in the tank's headspace to be communicated to said main orifice while shedding liquid away from said main valve member and main orifice so as to thereby minimize the intrusion of liquid into the vapor control system, in which said further wall structure is disposed radially inwardly of said wall, and in which each of said apertures comprises a lower edge which declines in the radially outward direction between radially inner and radially outer surfaces of said wall.

7. The improvement set forth in claim 6 in which said further wall structure has an axial extent greater than said apertures so as to axially overlap said apertures.

8. In combination with a tank for a volatile combustible liquid, an associated vapor control system which is in communication with the tank's headspace, and a roll-over valve assembly which controls flow between the tank's headspace and the vapor control system by being normally open when the tank is upright but closing when the tank is tipped a predetermined amount from upright, said roll-over valve assembly comprising a main axis along which a main orifice and a main valve member are cooperatively arranged to open and close the valve assembly, the improvement which comprises said main orifice and said main valve member being disposed in the tank's headspace but circumferentially bounded by a wall disposed radially outwardly thereof, one or more apertures extending radially through said wall, and further wall structure disposed in circumferential registry with and spaced radially from said one or more apertures, said wall and said further wall structure coacting to allow vapor pressure in the tank's headspace to be communicated to said main orifice while shedding liquid away from said main valve member and main orifice so as to thereby minimize the intrusion of liquid into the vapor control system, and in which said main valve member is integrally formed with a cage within which a sphere is captured, said valve assembly having a conical seat for said sphere, said seat having a slot which guides said cage, said seat, said sphere and said cage being constructed and arranged such that tipping of the tank causes said sphere to roll along the conical seat and carry with it the cage for operating the main valve member toward said main orifice.

9. A roll-over valve comprising a valve body having an inlet adapted to be communicated to the headspace of a tank for a volatile combustible liquid and an outlet adapted to be communicated to a vapor control system, an orifice through which flow between said inlet and said outlet is constrained to pass, and an attitude-responsive valve member disposed to the inlet side of said orifice for selectively opening and closing said orifice in accordance with the attitude of the roll-over valve relative to the vertical, and a combination relief and vent valve disposed to the outlet side of said orifice and comprising means operable when said orifice is open for venting the outlet to the inlet when the pressure at the outlet is positive relative to that at the inlet and for relieving the inlet to the outlet when the pressure at the inlet is positive relative to that at the outlet by more than a predetermined amount, in which said combination relief and vent valve comprises a relief valve member which is biased toward said orifice, said relief valve member having a venting orifice and a vent valve member for opening and closing said venting orifice, and in which said relief valve member comprises a circular depression facing said first-mentioned orifice, said venting orifice extends from said circular depression through said relief valve member to be open to said outlet, said vent valve member comprises a circular disc, and including a circular, apertured retainer member fitted to said depression and having a circular pocket over said venting orifice within which said circular disc is disposed, said pocket comprising a diameter greater than that of said disc so as to allow the disc to float radially within the pocket to a certain extent, but with the diameters of the pocket and disc being such in relation to the size of said venting orifice that any radial float of the disc within the pocket will close said venting orifice when the pressure acting on the side of the disc toward the venting orifice is less than that on the opposite side of the disc, said retainer member having one of its apertures communicating said pocket to said first-mentioned orifice and being in substantial alignment with said venting orifice and at least one additional aperture communicating said pocket to said first-mentioned orifice spaced from said one aperture of said retainer member, the apertures of said retainer member having an organization and arrangement in relation to said disc such that for any radial float of the disc within the pocket at least one of the apertures of said retainer member will conduct flow through the retainer member when the disc is disposed against the pocket by the pressure acting on the side of the disc toward the venting orifice exceeding that on the opposite side of the disc.

10. A roll-over valve comprising a valve body having a main axis which is intended to be disposed in a generally vertical attitude, said valve body having an inlet adapted to be communicated to the headspace of a tank for a volatile combustible liquid and an outlet adapted to be communicated to a vapor control system, a main orifice through which flow between said inlet and outlet is constrained to pass, an attitude-responsive main valve member disposed for selectively opening and closing said orifice in accordance with attitude of the roll-over valve relative to the vertical, wherein said valve body has a sidewall circumferentially bounding said main valve member and said main orifice, said inlet comprising one or more apertures in said sidewall extending radially therethrough, and further wall structure spaced radially from said sidewall and in substantial registry with each of said apertures, said sidewall and said further wall structure cooperatively associating with said main valve member and said main orifice to shed liquid so as to minimize the instrusion of liquid through said orifice to said outlet, and in which each of said apertures has a lower edge which declines downwardly in the radially outward direction.

11. A roll-over valve as set forth in claim 10 in which said further wall structure is disposed radially inwardly of said one or more apertures.

12. A roll-over valve as set forth in claim 10 in which said further wall structure has an axial extent greater than the corresponding aperture at the radially inner surface of said sidewall so that the lower edge of said further wall structure is disposed vertically below each said aperture at the radially inner surface of said sidewall.

13. A roll-over valve as set forth in claim 10 in which said valve body comprises one part which integrally contains said sidewall and said further wall structure.

14. A roll-over valve as set forth in claim 10 in which said valve body comprises two parts assembled together, one of said parts integrally containing said sidewall and the other of said parts integrally containing said further wall structure.

15. A roll-over valve comprising a valve body having a main axis which is intended to be disposed in a generally vertical attitude, said valve body having an inlet adapted to be communicated to the headspace of a tank for a volatile combustible liquid and an outlet adapted to be communicated to a vapor control system, a main orifice through which flow between said inlet and outlet is constrained to pass, an attitude-responsive main valve member disposed for selectively opening and closing said orifice in accordance with attitude of the roll-over valve relative to the vertical, wherein said valve body has a sidewall circumferentially bounding said main valve member and said main orifice, said inlet comprising one or more apertures in said sidewall extending radially therethrough, and further wall structure spaced radially from said sidewall and in substantial registry with each of said apertures, said sidewall and said further wall structure cooperatively associating with said main valve member and said main orifice to shed liquid so as to minimize the intrusion of liquid through said orifice to said outlet, and wherein said valve body comprises a drain path through which combustible liquid which is shed internally of the valve body by said further wall structure can drain from the valve body when the roll-over valve is in use on a tank and including valving means coactive with said drain path to normally open the drain path for internally shed liquid and to close the drain path when liquid attempts to enter the valve body through the drain path.

16. A roll-over valve comprising a valve body having a main axis which is intended to be disposed in a generally vertical attitude, said valve body having an inlet adapted to be communicated to the headspace of a tank for a volatile combustible liquid and an outlet adapted to be communicated to a vapor control system, a main orifice through which flow between said inlet and outlet is constrained to pass, an attitude-responsive main valve member for selectively opening and closing said orifice in accordance with the attitude of the roll-over valve relative to the vertical, wherein said valve body has aperture means for communicating said inlet to said orifice but exposed to liquid splash when the roll-over valve is in use on a tank, and including a drain path separate from said aperture means through which liquid entering the valve body via said aperture means can drain back to the tank, and valving means independent of said main valve member and coactive with said drain path to normally open the drain path for draining liquid which has entered the valve body via said aperture means back to the tank and to close the drain path when the liquid attempts to enter the valve body through the drain path.

17. A roll-over valve as set forth in claim 16 in which said drain path comprises at least one hole in the bottom of said valve body and said valving means comprises a retainer cooperatively defining with said valve body a capturing space underlying said hole, and said valving means comprising a valve disc captured within said capturing space and having an axial and radial float within said capturing space, said retainer having at least one hole to communicate the capturing space to the tank, said valve disc having a cooperative association with the holes in said valve body and said retainer such that liquid which has entered the valve body will normally drain via said holes back to the tank while liquid attempting to enter the valve body via the at least one hole in the retainer will act on said valve disc to close the at least one hole in the valve body.

* * * * *